March 18, 1969  C. L. NIGH  3,433,539

BEARING RETAINER

Filed Dec. 9, 1966

INVENTOR.
Carl L. Nigh

BY a. M. Heiter

ATTORNEY

United States Patent Office

3,433,539
Patented Mar. 18, 1969

3,433,539
BEARING RETAINER
Carl L. Nigh, Brownsburg, Ind., assignor to General Motors Corporation, Detroit, Mich., a corporation of Delaware
Filed Dec. 9, 1966, Ser. No. 600,576
U.S. Cl. 308—22
Int. Cl. F16c 9/00, 13/00, 35/00
6 Claims

ABSTRACT OF THE DISCLOSURE

A bearing retainer for half shell bearing insert including a retaining sleeve or hollow stepped pin located in aligned apertures in the bearing carrier and the the bearing insert. The bearing retainer maintains only the axial position of bearing insert relative to the carrier while the circumferential position of the bearing is established by contact between the bearing insert and the carrier.

---

The present invention relates to bearings and more particularly to bearing retainers for use with plain journal bearings.

This bearing combination comprises a bearing carrier and a bearing shell or insert having independent circumferential and axial locating means to hold the bearing insert in the bearing carrier respectively against circumferential and axial forces. Preferably, the bearing carrier has a cylindrical surface which radially supports the back surface of the bearing insert and two axially extending abutment surfaces, circumferentially spaced, which abut the circumferential end surfaces of the bearing insert to prevent rotary and radial movement and permit axial movement of the bearing insert relative to the bearing carrier. Relative axial movement between the bearing carrier and the bearing insert is prevented by a bearing retainer secured to one and fitted to the axial dimension of an opening or aperture in the other. The aperture is preferably elongated in the circumferential direction so that the bearing retainer does not prevent rotary movement of the bearing insert. Preferably, the opening or aperture is in the bearing insert, so the bearing retainer is secured to the stronger bearing carrier and slides in the opening or aperture to permit rotary and radial movement of the bearing insert. Since the forces tending to move the bearing insert axially are less than the forces tending to rotate the bearing insert, a simple strong rotary abutment is used in combination with a very low cost fastener located in the oil hole providing an axial abutment.

This bearing retainer is a stepped sleeve member held in a bearing carrier by deforming one end of the bearing retainer or by a snap ring engaging a groove in the bearing carrier and contacting the bearing retainer. The bearing retainer extends through the bearing carrier to engage a bearing insert thereby preventing axial movement of the bearing insert relative to the bearing carrier.

An object of the present invention is to provide an improved bearing retainer which is not rigidly attached or secured to either the bearing insert or the bearing carrier.

Another object of this invention is to provide a bearing retainer which prevents only axial movement of the bearing insert.

Another object of this invention is to provide a bearing combination having an insert retained in a carrier by one locating means preventing only rotary movement and another centrally positioned locating means preventing only axial movement.

Figure 1:
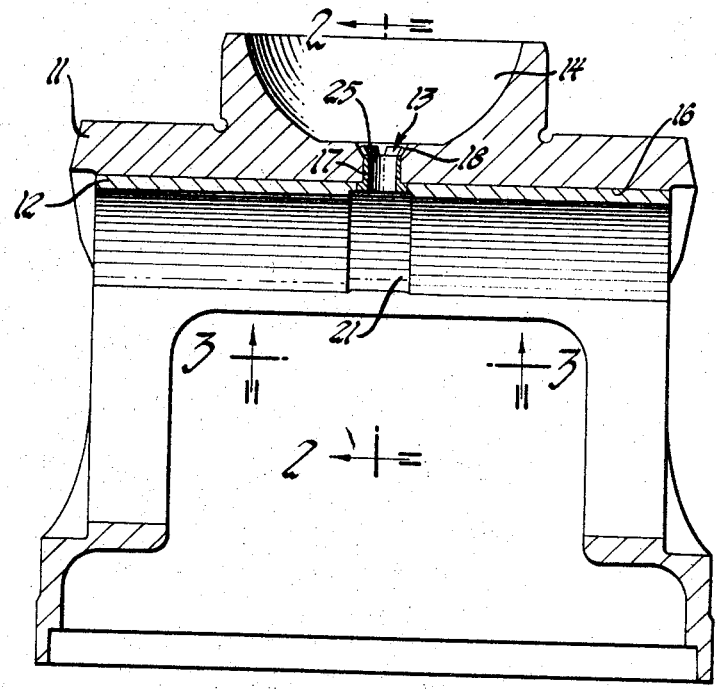
Figure 2:
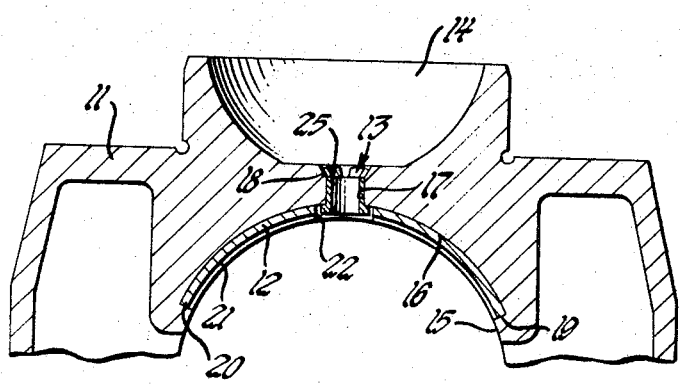
Figure 3:
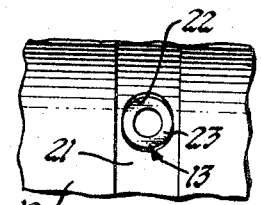
Figure 5:
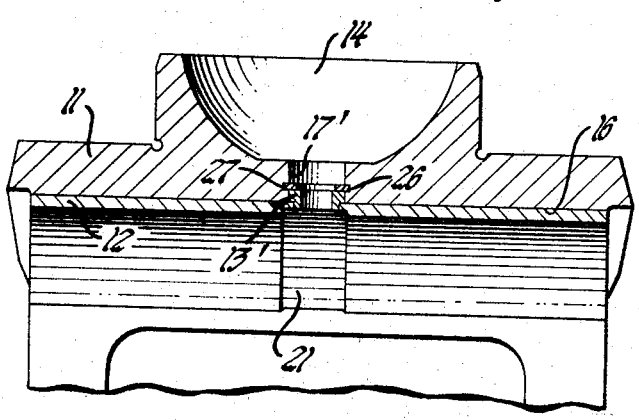
Figure 4:
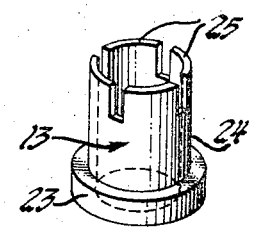

The nature of this invention as well as other objects and advantages thereof will be readily apparent from consideration of the following specification relating to the annexed drawings in which:

FIGURE 1 is a sectional elevation view;
FIGURE 2 is a section view on line 2—2 showing the bearing retainer;
FIGURE 3 is a partial plan view as taken upon line 3—3;
FIGURE 4 is a perspective view showing the preferred embodiment of the bearing retainer;
FIGURE 5 is a view similar to FIGURE 1 showing another embodiment of the bearing retainer.

Referring now to the drawings, wherein like reference characters represent like or corresponding parts throughout the several views, there is shown a bearing carrier 11, a bearing insert 12 and a bearing retainer 13. The bearing carrier 11 has a cup-shaped recess 14 for storing a lubricant. A cylindrical aperture 15 extends through the bearing carrier 11 from side to side. The cylindrical aperture 15 has an arcuate recess portion 16 extending along the circumference of cylindrical aperture 15, which is communicated to the cup-shaped recess 14 by a passage 17. The passage 17 has a conical shaped section 18 adjacent to the intersection of the passage 17 and the cup shaped recess 14.

The bearing insert 12 contacts the bearing carrier in the arcuate recess portion 16. The ends 19 and 20 of the arcuate recess portion 16 prevent rotational movement of the bearing insert 12. The bearing insert 12 has a circumferential recessed portion 21, and an elongated aperture 22 extending through the bearing insert 12 from the recessed portion 21. The elongated aperture 22 is aligned with the passage 17 to allow a lubricant to pass from the cup-shaped recess 14 to the circumferential recess 21.

The bearing retainer 13 is a stepped sleeve member having a large diameter end portion 23, a cylindrical portion 24 and arcuate tangs 25 on the end of the cylindrical portion 24 opposite the large diameter end portion 23.

The large diameter portion 23 of the bearing retainer 13 contacts the bearing insert 12 at the narrow dimension of the elongated aperture 22 as shown in FIGURES 1 and 3. This contact prevents axial movement of the bearings insert 12. The cylindrical portion 24 contacts the passage 17 in the bearing carrier 11. The arcuate tangs 25 are deformed outwardly contacting the conical shaped section 18 of the bearing carrier 11 and the large diameter end portion 23 contacts the arcuate recess portion 16 of the bearing carrier 11. The cooperation of the deformed tangs 25 and the large diameter end 23 prevents axial movement of the bearing retainer 13 relative to the bearing carrier 11.

A modification of the bearing retainer is shown in FIGURE 5. In this embodiment, the bearing carrier 11 is the same as above except the passage 17' has a snap ring groove 26 positioned between the cup-shaped recess 14 and the arcuate recess 16. The bearing retainer 13' is a stepped diameter sleeve. The larger diameter portion of the bearing retainer 13' contacts the passage 17', the snap ring 27 and the bearing insert 12. The smaller diameter portion of the bearing retainer 13' contacts the bearing insert 12 in the elongated aperture 22, thereby preventing axial movement of the bearing insert 12 relative to the bearing carrier 11.

Thus a simple low cost bearing construction is provided, wherein the bearing insert is restrained against the large forces tending to rotate the bearing only by the sides of the insert abutting the ends 19 and 20 of the recess portion 16. These simple straight abutment surfaces use the full cross section of the insert to support this large load with a uniform stress distribution. The force tending to axially move the insert has a much lower value. Thus the simple retainer 13 is inserted in the normally available oil passage to prevent only axial movement while permitting rotary and radial movement. Therefore, the retainer need not have the strength to restrain these large rotary and radial forces.

Obviously, many modifications and variations of the present invention are possible in light of the above teachings. It is, therefore, to be understood that within the scope of the appended claims, the invention may be practiced otherwise than as specifically described.

I claim:

1. In a bearing assembly, a bearing carrier having an arcuate recessed portion, abutment surface means extending substantially the full length of said recessed portion at the circumferentially spaced sides of said arcuate recessed portion and a passage extending through said bearing carrier and communicating with said arcuate recessed portion, a bearing insert having a cylindrical portion contacting said bearing carrier in said arcuate recessed portion and a longitudinal side substantially completely contacting said abutment surface means and having an aperture aligned with said passage in said bearing carrier, one of said passage and aperture being elongated in the circumferential direction, a bearing retainer means comprising a sleeve in said passage and in said aperture, said bearing retainer means contacting axially opposite walls of said passage and aperture to prevent axial movement only of said bearing insert relative to said bearing carrier and being relatively movable in said elongated one of said passage and aperture and fixed to the other to permit circumferential movement of said bearing insert relative to said bearing carrier for load supporting contact between said longitudinal side of said bearing insert and said abutment surface means without circumferential load supporting contact by said bearing retainer means.

2. The bearing assembly defined in claim 1 and said aperture being elongated, said sleeve being stepped and having a large diameter on one end, a cylindrical body portion and arcuate tangs on another end, said large diameter contacting said bearing insert, said cylindrical body portion contacting said bearing carrier in said passage thereof, said arcuate tangs being deformed radially outwardly to cooperate with said large diameter to prevent axial movement of said bearing retainer means relative to said bearing carrier.

3. In a bearing assembly, a bearing carrier, a bearing insert, rotary locating means on said bearing carrier and said bearing insert preventing rotation and permitting relative axial movement of said bearing insert relative to said bearing carrier, and axial bearing retainer means including carrier stop means on said bearing carrier and insert stop means on said bearing insert, a single retainer member engaging said carrier stop means and said insert stop means and secured to one of said bearing carrier and bearing insert and contacting the other preventing only relative axial movement between said bearing insert and said bearing carrier and having a clearance permitting relative rotary movement to permit said bearing insert to contact said rotary locating means for circumferential rotary load support thereof.

4. The invention defined in claim 3 and said rotary locating means consisting of opposed straight axial abutment surfaces on said bearing carrier and bearing insert.

5. The invention defined in claim 3 and said carrier stop means being an oil passage in said bearing carrier, said insert stop means being an oil passage in said bearing insert and said retainer member being a sleeve to provide a continuous oil passage to the bearing surface.

6. The invention defined in claim 3 and said carrier stop means being an opening in said bearing carrier, said insert stop means being an opening in said bearing insert, said retainer member being a sleeve fixed in said opening in said bearing carrier and having a portion partially projecting into said opening in said bearing insert and contacting the axial side walls of said opening in said bearing insert to prevent relative axial movement of said bearing and bearing insert and having circumferential clearance in said opening to permit relative rotary movement of said bearing carrier and bearing insert and having freedom for relative radial movement of said bearing carrier and bearing insert.

References Cited

UNITED STATES PATENTS

| 461,151 | 10/1891 | Mitchell | 308—79 |
| 2,335,638 | 11/1943 | Bogner | 308—74 |
| 421,089 | 2/1890 | Wood | 308—237 |
| 775,728 | 11/1904 | Miller | 85—84 |
| 1,475,377 | 11/1923 | Fleming | 308—245 |
| 1,773,877 | 8/1930 | Severin | 308—23 |
| 2,037,326 | 5/1936 | Howarth | 308—160 |
| 2,267,859 | 12/1941 | Fedden | 308—240 |
| 2,566,080 | 8/1951 | Davids | 308—240 |
| 2,582,433 | 1/1952 | Hitchcock | 308—237 |
| 2,661,253 | 12/1953 | Barlow | 308—240 |

FOREIGN PATENTS

| 642,986 | 3/1936 | Germany. |
| 3,438 | 5/1902 | Great Britain. |

OTHER REFERENCES

Rings for Fastenings; Product Engineering, December 1933; pp. 454 and 455.

MARTIN P. SCHWARDRON, *Primary Examiner.*

U.S. Cl. X.R.

308—78, 124, 240